Dec. 11, 1934.   J. J. GREBE ET AL   1,984,341
DIRECT READING RELATIVE HUMIDITY INDICATOR
Filed Dec. 5, 1931   3 Sheets-Sheet 1
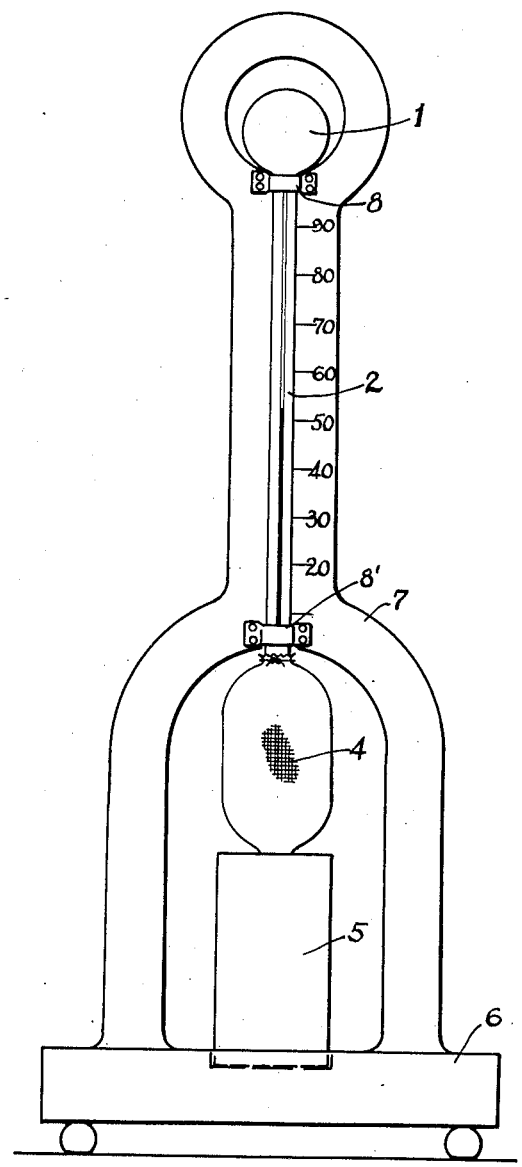
Fig.1
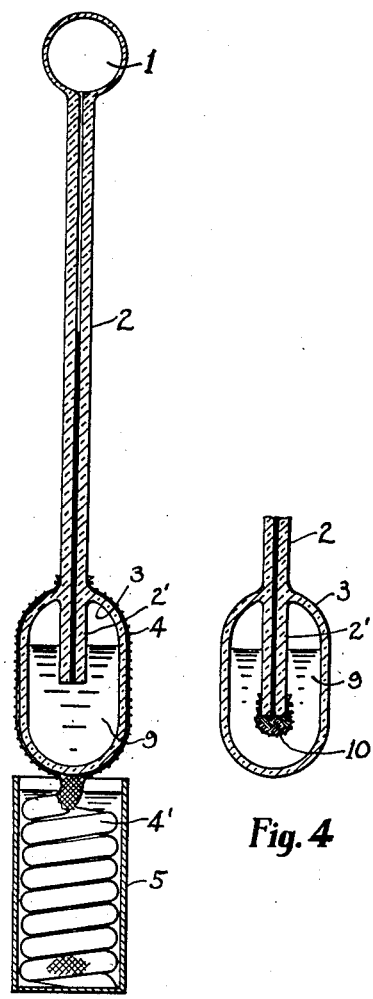
Fig.3
Fig.4
INVENTORS
John J. Grebe
BY Leonard C. Chamberlain
Thomas Griswold, Jr.
ATTORNEY Dec. 11, 1934.   J. J. GREBE ET AL   1,984,341
DIRECT READING RELATIVE HUMIDITY INDICATOR
Filed Dec. 5, 1931   3 Sheets-Sheet 2

INVENTORS
John J. Grebe and
BY Leonard C. Chamberlain
Thomas Griswold, Jr.
ATTORNEY Dec. 11, 1934.  J. J. GREBE ET AL  1,984,341
DIRECT READING RELATIVE HUMIDITY INDICATOR
Filed Dec. 5, 1931  3 Sheets-Sheet 3

INVENTORS
John J. Grebe and
BY Leonard C. Chamberlain
Thomas Griswold, Jr.
ATTORNEY Patented Dec. 11, 1934

1,984,341

UNITED STATES PATENT OFFICE 1,984,341

DIRECT READING RELATIVE HUMIDITY INDICATOR

John J. Grebe and Leonard C. Chamberlain, Midland, Mich., assignors to The Dow Chemical Company, Midland, Mich., a corporation of Michigan Application December 5, 1931, Serial No. 579,196

7 Claims. (Cl. 73—24)

The present invention relates to relative humidity indicators and particularly to the direct reading type.

A widely used humidity indicator consists of two independent wet and dry bulb thermometers and a chart or table of relative humidities to be ascertained from the wet and dry bulb readings. The observer reads the two thermometers, subtracts the readings to obtain the wet bulb depression and then enters the table with the two values, viz;—wet bulb depression and dry bulb temperature, reading from the table, then, the relative humidity corresponding to such readings.

A more simple and direct method, and a device to carry it out is highly desirable. An instrument which will indicate directly the relative humidity corresponding to wet and dry bulb temperatures will simplify the procedure and eliminate errors apt to occur in subtracting or in the use of a chart or table. Such an instrument will be highly useful in homes, offices, factories, warehouses, etc. where knowledge of relative humidity is desirable or imperative and control thereof likewise of interest, or mandatory.

To the accomplishment of the foregoing and related ends, the invention, then, consists of the apparatus hereinafter fully described and particularly pointed out in the claims, the annexed drawings and the following description setting forth in detail several forms of apparatus and modes of carrying out the invention, such disclosed forms and modes illustrating, however, but several of the various ways in which the principle of the invention may be used.

Figure 2:
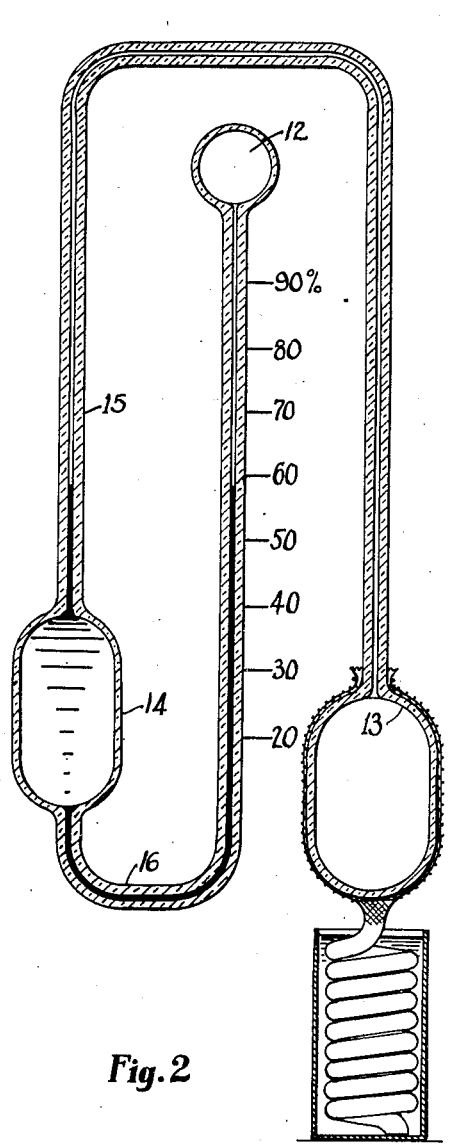
Figure 8:
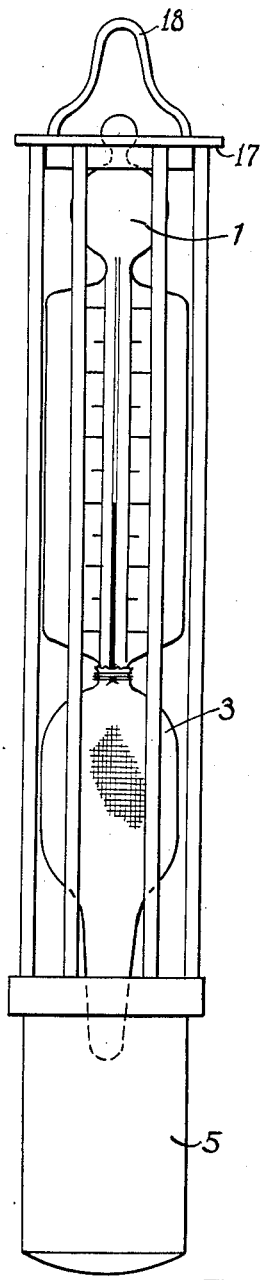
Figure 5:
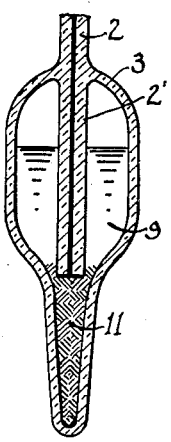
Figure 6:
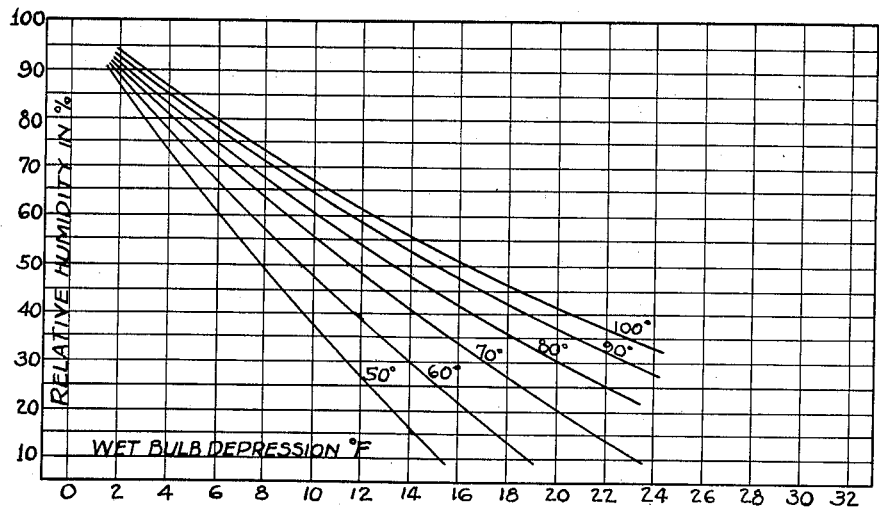
Figure 7:
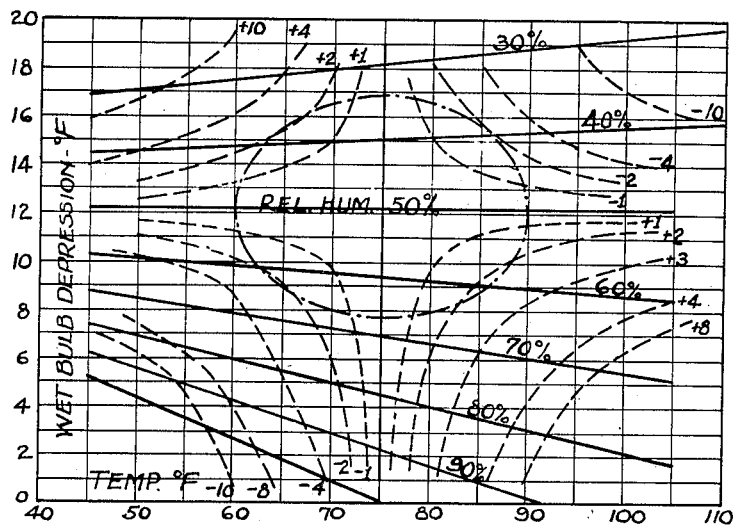

In the accompanying drawings illustrating a simple form of the indicator, Fig. 1 is a general elevation of one form of the instrument, Fig. 2 a like elevation in part section of another form thereof, Fig. 3 a vertical transverse cross-section of the essential elements of Fig. 1, Figs. 4 and 5 vertical cross-sections of alternative wet bulb constructions, Fig. 6 is a chart showing relative humidities plotted against wet bulb depression for various dry bulb temperatures, Fig. 7 is a chart in which wet bulb depression is plotted against temperature, showing also error of a certain compensated indicator, and Fig. 8 represents a further alternative form of construction.

Our instrument comprises two temperature sensitive elements operating in opposed relation upon a compensatory quantity of liquid which serves also as an indicator. One of the two elements is a wet bulb and the other element is a dry bulb. To compensate for variations in the dry bulb temperature and permit direct reading of the indications as relative humidity, we superimpose upon the differential thermometer formed by the opposed wet and dry bulbs the effect of a compensating quantity of a liquid which corrects automatically the error caused by variations in dry bulb temperature without actual variations in relative humidity.

We illustrate in the drawings simple methods of applying our invention. We employ, as indicated, a differential gas thermometer comprised of two gas bulbs with a connecting tube in which the compensatory quantity of fluid is contained. Alongside the tube is a scale according to which the level of the liquid may be read off directly in terms of relative humidity. Compensation of variations in the pressure differential of the wet and dry bulbs due to temperature changes is effected by the expansion of the intermediate liquid body, which will decrease the gas volume in the wet bulb or increase the gas volume in the dry bulb with rising dry bulb temperature. Such decrease or increase has, of course, the same effect as decreasing pressure in the dry bulb or increasing pressure in the wet bulb.

Many different forms of indicator are possible of construction having varying degrees of accuracy and range. We will illustrate, however, our invention by describing simple forms having a dry gas bulb connected with a wet gas bulb by an indicator tube and a chamber containing a compensating quantity of liquid having a pressure connection to the wet bulb and which liquid, by rising into the tube, serves as indicator as the upper limit thereof traverses a suitable scale in fixed relation to the tube and bulbs, or having a visible indicator of any kind in the connecting tube responsive to pressure changes in the wet and dry gas chambers. For the compensating body of liquid, we employ a liquid having a suitably low vapor tension, and a quantity or body thereof such that, as its temperature changes, the liquid expands or contracts and causes the reading on the differential gas thermometer scale to be larger or smaller, respectively, than it would be were the compensating liquid not exerting its influence upon the gas pressure.

Referring, then, to the drawings, 1 is the dry bulb, 2 the connecting tube, here shown as a capillary tube, 3 the wet bulb, 4 a suitable capillary fabric covering the wet bulb, the extended portion 4' of which dips into a water cistern 5. The elements 1, 2, 3 and 5 are shown in Fig. 1 attached to, and/or supported by a framed structure comprised of a base 6, a standard 7 and fasteners 8 and 8'. The dry and wet bulbs may be, and the connecting tube is, of glass, and the assembly of such parts is sealed tight.

The lower end 2' of the connecting tube 2 in Figs. 1, 3 and 4, extends into the wet bulb and dips into a liquid 9 therein, the volume of which is chosen so as to compensate the differential thermometer reading to convert it to a relative humidity reading for which a scale, here shown in Fig. 1 as extending from 20 per cent to 90 per cent relative humidity, is marked upon the standard 7. The rise and fall of the compensating liquid in the tube 2 indicates on the scale the relative humidity corresponding to the wet and dry bulb temperatures.

To illustrate further the principle of compensation, a calculation is given below to ascertain for the indicator illustrated in Fig. 1 the volume of the compensating liquid to be supplied.

Referring to Fig. 6, a study of the curves therein showing the relative humidity vs. wet bulb depression for the temperatures 50°, 60°, 70°, 80°, 90°, and 100° F. shows that at 50 per cent relative humidity the wet bulb depressions are approximately 7.9°, 9.6°, 11.5°, 13.0°, 14.7°, and 16.4° F., respectively, representing a nearly uniform change in value for each 10° F. This change in wet bulb depression from 50° F. to 100° F., i. e. 16.4°–7.9°, accounts for a change in pressure of $$\frac{8.5}{535}\text{'s}$$

of that in the wet bulb or 1.57 per cent. The figure 535 in the foregoing fraction represents the mean absolute Fahrenheit temperature between 50° and 100° F. The change in wet bulb depression accounts for a change of pressure therein in accordance with well known gas laws. Therefore, in order that the indicator shall read the same for the wet bulb temperature depression of 16.4° F. at 100° dry bulb as for the depression of 7.9° F. at 50° dry bulb temperature, there must be a compression of the gas in the wet bulb amounting to 1.57 per cent of its original volume. If, then, V be taken as the volume in cc. of gas to be used in the wet bulb, then .0157V is the cc. volume decrease that should be effected. If C be taken as the coefficient of cubical expansion of a suitable liquid for use as compensator and/or as indicator liquid, that is, one of low freezing point and low vapor pressure in the range used; X equals the cc. of such liquid; 83.6 represents the maximum wet bulb temperature and 42.1 the minimum wet bulb temperature, and 41.5 is the total temperature range over which the temperature of the liquid may vary; then (83.6−42.1 or 41.5)$CX$=.0157V, the cc. expansion of the fluid, if placed in the wet bulb, and $$X = \frac{.0157V}{41.5C}$$

Alpha-brom-naphthalene is a suitable fluid for which $C=.000378$ cc. per degree F. per cc. Taking V equal to 5 cc., $$X = \frac{.0157 \times 5}{41.5 \times .000378} = 5 \text{ cc.}$$

alpha-brom-naphthalene. Therefore, alpha-brom-naphthalene should occupy 50 per cent of the volume of the wet bulb. According to the above data the complete equation for calculating the volume of compensatory liquid to be used in constructing an instrument as illustrated in Figure 1 would be as follows:—

$$X = V \times \frac{\dfrac{D}{459.4 + T}}{D \times C}$$

wherein X represents the volume in cubic centimeters of liquid, V represents the volume in cubic centimeters of gas in the wet bulb, C represents the coefficient of cubical expansion of the liquid in cubic centimeters per degree Fahrenheit per cubic centimeter, D represents in degrees Fahrenheit the maximum wet bulb temperature minus the minimum wet bulb temperature, and T represents the mean wet bulb temperature in degrees Fahrenheit.

A number of suitable compensating liquids are available, among which may be mentioned ortho-dibrom-benzene, and the volume of such liquid relative to the air volume in the wet bulb for 50 per cent relative humidity may be found in like manner by substituting its expansion coefficient in the equation given, and a similar calculation may be made for any such liquid at any relative humidity value.

The action of the compensating liquid is to change volume with temperature variation and to modify thereby wet bulb gas pressure to the end that the indication at some chosen relative humidity shall remain substantially constant for that chosen relative humidity during dry bulb temperature variations, and such indication may then be marked on the scale as such chosen relative humidity.

The rise and fall, then, of the indicating fluid or indicator in the tube, or its traverse therein, indicating primarily change in relative gas pressures due to change in wet bulb temperature depression following change in relative humidity at some chosen constant dry bulb temperature, may therefore be scaled as the corresponding relative humidity indications which will be substantially true for that chosen temperature over the humidity range of use because of the pressure resultant in the wet bulb due to the pressure exerted thereon by the volume changes of the compensating liquid.

Having then partially filled the wet bulb of Fig. 1 with the compensating fluid to the extent indicated by the calculation, the instrument may then be calibrated and scaled for different relative humidities at some one chosen dry bulb temperature, say 75° F. and the column of such fluid in the tube or the indicator therein will then indicate on the scale the relative humidity corresponding to the wet and dry bulb temperatures, which indication will be substantially accurate for all absolute temperatures at the relative humidity chosen in making the calibration, e. g. 50 per cent in the example, and likewise substantially accurate for all relative humidities at the calibrating temperature chosen, e. g. 75° F. in the example.

By choosing calibration temperature and relative humidity values approximating the average of the range thereof, under the conditions of use to which the instrument is to be exposed, substantial accuracy for all practical purposes may be secured over a very considerable range of both temperature and humidity values.

Thus, for the example chosen, the error is under 1 per cent over a very considerable range of temperatures and humidities and under 2 per cent over a much larger range. This is clearly indicated in chart, Fig. 7, upon which the dashed lines, marked +1, −1, +2, −2, etc., show the error in reading for any given temperature and humidity for the instrument calibrated for accuracy at 75° F. or at 50 per cent humidity. This chart shows, then, that if the instrument described has been calibrated as described, the error of the indications will be under 1 per cent for all temperatures and relative humidities falling within the area included within the dashed lines marked +1 and −1, and, likewise, such error will be under 2 per cent for all such temperature and humidity values falling within the area included within the dashed lines marked +2 and −2. The oval area circumscribed by the heavy dashed line on the 75° F. and 50 per cent relative humidity axes covers the range of most common use of such an instrument, and within the bulk of such area the error is under 1 per cent and is further under 2 per cent in any part thereof.

We have described our invention in the form illustrated in Fig. 1, but such invention is in no way limited to such details of construction and/or arrangement of parts or elements. Many modifications will occur to anyone skilled in the art which may be employed without departing from the spirit of our invention. The differential thermometer itself may have the tube bent to indicate on an horizontal or inclined scale; it may be in U form, S form or other shape as desired and the manner of its support or mounting may be varied over a wide range of design. Certain advantageous modifications are illustrated, however, in Figs. 3, 4 and 5 and will now be fully described.

Referring to Fig. 3 which is a cross-sectional elevation of the elements of the differential thermometer and water cistern shown in Fig. 1, we may choose for the compensating fluid 9 a liquid having a coefficient of expansion which will require that more than half of the wet bulb shall be filled with such liquid and we then carry the tube down into the wet bulb to approximately its center point. Such construction and choice of liquid insure that the opening of the tube into the liquid will normally be sealed thereby, in any position the instrument may occupy during manufacture, shipment or handling, whereby the liability of entrance of air into the tube after calibration, is greatly reduced. As an example of a liquid having a coefficient of expansion to permit the filling of the wet bulb to more than half its cubical capacity, we mention glycerine.

In Fig. 4 is shown a further modification of the wet bulb, which construction is suited to the use of any suitable compensating liquid, irrespective of the extent to which it fills the bulb. We here tie or secure under the lower end of the tube, normally dipping into the liquid, a small mass, bundle, or pellet 10 of fibrous or porous material capable of holding a portion of the liquid in contact with the lower end of the tube under conditions in which, owing to inversion or shaking of the instrument, the main body of the liquid might recede from the end of the tube and leave it exposed to the air in the bulb, whereby such air is prevented or hindered from entering the tube. The pellet may be retained by a permeable or impermeable bag or equivalent provided the pellet is compressible and the bag be impermeable so that the pressure may be transmitted therethrough. The pellet may be entirely omitted if the impermeable bag be flexible.

In Fig. 5 is shown a further modification of the wet bulb along the lines shown in Fig. 4. Here the end of the tube, dipping into the wet bulb liquid, is carried down to hold in position a body of fibrous material or equivalent 11 in the bottom of the bulb. Inversion of the tube will leave the end thereof sealed with the wet fibrous material, substantially preventing or hindering the entrance of air into the tube after calibration.

A still further construction is illustrated in Fig. 2. In such construction, 12 is a dry gas bulb, 13 a wet gas bulb, 14 a chamber containing the compensating liquid, connected by tube 15 to the wet bulb and by tube 16 to the dry bulb. Tube 16 is the indicator tube in which, as here shown, the compensating liquid serves as indicator. In this construction the compensating chamber is dry instead of wet and such dry condition is preferable in some respects to a wet condition since the compensating action follows dry bulb temperature and exerts a more nearly straight line action upon wet bulb pressure. Such an instrument will be calibrated in manner similar to that already described.

We may further employ any suitable compensating agent capable of exerting pressure change upon gas pressure with temperature change. A water solution of lithium chloride or bromide may be employed in even very small amount, the change in vapor pressure with temperature change acting upon the gas pressure to modify same in the manner described. Normally solid matter, such as paraffin wax, may be employed to exert a like effect by reason of its cubic volume changes with temperature change thereof.

In Fig. 8 we show a form of construction in which a metal cage 17 encloses and supports a wet and dry bulb differential gas thermometer in which 1 is the dry bulb, 3 the wet bulb shown in Fig. 5, here covered by fabric, 5 the cistern and the scale is carried upon glass flanges of the tube as shown. A hook or ring 18 permits suspending the assembly as desired in the space to be indicated.

The number of possible variations in indicating and compensating means and details of construction and/or arrangement of elements is legion and we have contented ourselves in the full description of the simple means herein disclosed as adequate to enable one skilled in the art to substitute any preferred compensating and/or indicating means in the compensated differential gas thermometers herein disclosed.

Other modes of applying the principle of our invention may be employed instead of the ones explained, change being made as regards the means and the steps herein disclosed, provided those stated by any of the following claims or their equivalent be employed.

We therefore particularly point out and distinctly claim as our invention:—

1. In apparatus for indicating relative humidity comprising wet and dry bulbs containing gases in such bulbs and including between the bulbs a passageway of which at least a part is transparent, a compensatory quantity of liquid interposed between the gases in said bulbs whereby any variation in the indication of said apparatus as shown by movement of said liquid in the transparent part of said passageway is solely due to a change in relative humidity.

2. In apparatus for indicating relative humidity comprising wet and dry bulbs containing gases in such bulbs and including therebetween a passageway of which at least a part is transparent, a compensatory quantity of alpha-bromonaphthalene interposed between the gases in said bulbs whereby any variation in the indication of said apparatus as shown by movement of said liquid in the transparent part of said passageway is solely due to a change in relative humidity.

3. In apparatus for indicating relative humidity the combination of; a dry bulb comprising a closed chamber and a gas therein; a wet bulb comprising a second closed chamber, a gas therein and means to wet the outer surface of said second closed chamber; a passageway, of which at least a part is transparent, connecting said wet and dry bulbs; a compensatory quantity of liquid interposed between the gases in said wet and dry bulbs, of which liquid at least a portion occupies a part of said passageway, and adapted to movement in said passageway such that the meniscus of the liquid portion therein is visible in the transparent part thereof; and a scale in terms of relative humidity positioned adjacent to the visible part of said passageway whereby relative humidity can be read directly therefrom according to the position of the said liquid meniscus in relation to the markings thereon.

4. In apparatus for indicating relative humidity the combination of; a dry bulb comprising a closed chamber and a gas therein; a wet bulb comprising a second closed chamber, a gas therein, and means to wet the outer surface of said second closed chamber; a passageway, of which at least a part is transparent, connecting said wet and dry bulbs extending into said second chamber; a compensatory quantity of liquid, largely contained in said second chamber, covering the end of the passageway extending into said second chamber, occupying a part of said passageway, and adapted to movement in said passageway such that the meniscus of the liquid portion therein is visible in the transparent part thereof; and a scale in terms of relative humidity positioned adjacent to the visible part of said passageway whereby relative humidity can be read directly therefrom according to the position of the said liquid meniscus in relation to the markings thereon.

5. In apparatus for indicating relative humidity the combination of; a dry bulb comprising a closed chamber and a gas therein; a wet bulb comprising a second closed chamber, a gas therein, and means to wet the outer surface of said second closed chamber; a passageway, of which at least a part is transparent, connecting said wet and dry bulbs; a compensatory quantity of liquid in said passageway, and a portion thereof adapted to movement in said passageway such that the meniscus of that portion is visible in the transparent part thereof; and a scale in terms of relative humidity positioned adjacent to the visible part of said passageway whereby relative humidity can be read directly therefrom according to the position of the said liquid meniscus in relation to the markings thereon.

6. In apparatus for indicating relative humidity the combination of; a dry bulb comprising a closed chamber and a gas therein; a wet bulb comprising a second closed chamber, a gas therein and means to wet the outer surface of said second closed chamber; a passageway, of which at least a part is transparent, connecting said wet and dry bulbs; a compensatory quantity of alpha-bromonaphthalene interposed between the gases in said wet and dry bulbs, of which alpha-bromonaphthalene at least a portion occupies a part of said passageway, and is adapted to movement in said passageway such that the meniscus of the portion therein is visible in the transparent part thereof; and a scale in terms of relative humidity positioned adjacent to the visible part of said passageway whereby relative humidity can be read directly therefrom according to the position of the said alpha-bromonaphthalene meniscus in relation to the markings thereon.

7. In a direct reading relative humidity instrument the combination of; a dry bulb comprising a closed chamber and a gas therein; a wet bulb comprising a second closed chamber, a gas therein and means to wet the outer surface of said second chamber; a passageway, of which at least a part is transparent, connecting said wet and dry bulbs and extending into said second chamber; a quantity of liquid covering the end of, and partially in, the passageway extending into said second chamber, such liquid occupying a portion of said second chamber according to the following formula:—

$$X = V \times \frac{D}{\frac{459.4 + T}{D \times C}}$$

wherein X represents the volume in cubic centimeters of liquid, V represents the volume in cubic centimeters of gas in the wet bulb, C represents the coefficient of cubical expansion of the liquid in cubic centimeters per degree Fahrenheit per cubic centimeter, D represents in degrees Fahrenheit the maximum wet bulb temperature minus the minimum wet bulb temperature in degrees Fahrenheit, and T represents the mean wet bulb temperature in degrees Fahrenheit, said liquid being adapted to movement in said passageway such that the meniscus of the liquid portion therein is visible in the transparent part thereof; and a scale in terms of relative humidity positioned adjacent to the visible part of said passageway whereby relative humidity can be read directly therefrom according to the position of the said liquid meniscus in relation to the markings thereon.

JOHN J. GREBE.
LEONARD C. CHAMBERLAIN.